United States Patent
Giannakakis et al.

(10) Patent No.: US 10,810,524 B1
(45) Date of Patent: Oct. 20, 2020

(54) DYNAMIC RESOURCE PREDICTION SIMULATION

(71) Applicant: Amazon Technologies, Inc., Seattle, WA (US)

(72) Inventors: Ioannis Giannakakis, Seattle, WA (US); Xiaoyu Zheng, Issaquah, WA (US); Eric C. Adams, Clyde Hill, WA (US); Salar Jahedi, Seattle, WA (US); Lillian S. Bleiman, Seattle, WA (US); Yi Huang, Clyde Hill, WA (US); Patrick Ludvig Bajari, Bellevue, WA (US); Eric Walter Zivot, Seattle, WA (US); Margret Steele, Seattle, WA (US); Ian Wallace, Seattle, WA (US); Jin Lai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 15/985,478

(22) Filed: May 21, 2018

(51) Int. Cl.
  *G06Q 10/06* (2012.01)
  *G06F 9/451* (2018.01)
  *H04L 29/06* (2006.01)

(52) U.S. Cl.
  CPC ......... *G06Q 10/0631* (2013.01); *G06F 9/451* (2018.02); *G06Q 10/06375* (2013.01); *H04L 63/083* (2013.01); *H04L 63/102* (2013.01)

(58) Field of Classification Search
  CPC .......... G06Q 10/0631; G06Q 10/06375; G06F 9/451; H04L 63/083; H04L 63/102
  See application file for complete search history.

(56) References Cited

U.S. PATENT DOCUMENTS

| | | | | | |
|---|---|---|---|---|---|
| 5,835,898 | A | * | 11/1998 | Borg | G06Q 10/0631 705/7.12 |
| 7,599,841 | B1 | * | 10/2009 | Koller | G06Q 10/06375 705/320 |
| 8,332,251 | B1 | * | 12/2012 | Morris | G06Q 10/06 705/7.22 |
| 2004/0078777 | A1 | * | 4/2004 | Bahrami | G06Q 10/067 717/105 |
| 2004/0162753 | A1 | * | 8/2004 | Vogel | G06Q 10/06 705/7.14 |
| 2005/0119928 | A1 | * | 6/2005 | Deitrich | G06Q 10/063112 705/7.14 |
| 2006/0010418 | A1 | * | 1/2006 | Gupta | G06Q 10/06 717/101 |
| 2006/0235732 | A1 | * | 10/2006 | Miller | G06Q 10/06 705/7.23 |
| 2007/0150327 | A1 | * | 6/2007 | Dromgold | G06Q 10/06 705/7.17 |

(Continued)

*Primary Examiner* — Sujay Koneru
(74) *Attorney, Agent, or Firm* — Knobbe Martens Olson & Bear LLP

(57) ABSTRACT

Features related to a system and method for dynamic resource prediction simulation are described. The predictions consider historical data collected by the organization or user revisions to planning inputs to predict the amount of a resource needed for a certain task and the amount of the resource able to perform the tasks. The system and method displays the predictions in a visual representation including control elements allowing a user to simulate a variety of scenarios and situations to allow the organization to properly reallocate resources or acquire an appropriate amount of the resource.

15 Claims, 9 Drawing Sheets

(56) References Cited

U.S. PATENT DOCUMENTS

| | | | |
|---|---|---|---|
| 2007/0162584 A1* | 7/2007 | Kokusho | G06F 9/5061 709/223 |
| 2007/0271128 A1* | 11/2007 | Terrence Bolling | G06Q 10/00 705/7.15 |
| 2008/0120152 A1* | 5/2008 | McCrea | G06Q 10/06 705/7.12 |
| 2008/0243575 A1* | 10/2008 | Weinberger | G06Q 10/06 705/7.13 |
| 2008/0312980 A1* | 12/2008 | Boulineau | G06Q 10/06 705/7.13 |
| 2008/0313595 A1* | 12/2008 | Boulineau | G06F 8/20 717/101 |
| 2009/0222310 A1* | 9/2009 | Vollmer | G06Q 10/06 705/7.23 |
| 2009/0222540 A1* | 9/2009 | Mishra | H04L 41/082 709/222 |
| 2011/0119202 A1* | 5/2011 | Williams | G06Q 10/00 705/348 |
| 2011/0184771 A1* | 7/2011 | Wells | G06Q 10/04 705/7.14 |
| 2012/0065944 A1* | 3/2012 | Nielsen | G06Q 10/103 703/1 |
| 2012/0197677 A1* | 8/2012 | Bhamidipaty | G06Q 10/06311 705/7.13 |
| 2014/0122143 A1* | 5/2014 | Fletcher | G06Q 10/0631 705/7.14 |
| 2014/0351184 A1* | 11/2014 | Bhowmick | G06Q 10/06 706/12 |
| 2015/0006211 A1* | 1/2015 | Santos | G06Q 10/06 705/7.12 |
| 2015/0095875 A1* | 4/2015 | Chen | G06F 8/10 717/101 |
| 2015/0100503 A1* | 4/2015 | Lobo | G06Q 10/103 705/301 |
| 2015/0193566 A1* | 7/2015 | Rolia | G06Q 10/0631 703/21 |
| 2015/0278736 A1* | 10/2015 | Spera | G06Q 10/06313 705/7.23 |
| 2015/0379447 A1* | 12/2015 | Katkar | G06Q 10/06313 705/7.17 |
| 2016/0063192 A1* | 3/2016 | Johnson | G16H 40/20 705/2 |
| 2016/0077880 A1* | 3/2016 | Santos | G06F 9/5011 718/104 |
| 2016/0180270 A1* | 6/2016 | Sun | G06Q 10/06313 705/7.23 |
| 2016/0203434 A1* | 7/2016 | Sivakumar | G06Q 10/063118 705/7.14 |
| 2016/0217600 A1* | 7/2016 | Ni | G06T 11/60 |
| 2016/0371441 A1* | 12/2016 | Day | G16H 40/20 |
| 2018/0348742 A1* | 12/2018 | Byrne | G05B 19/41865 |
| 2019/0043078 A1* | 2/2019 | Ma | G06Q 30/0244 |
| 2019/0238620 A1* | 8/2019 | Narayanam | H04L 67/18 |

* cited by examiner

DYNAMIC RESOURCE PREDICTION SIMULATION

BACKGROUND

The future is unknowable. This uncertainty presents many issues particularly in the field of delivery planning. If the future could be efficiently and quickly simulated, the proper number of resources could be predicted and acquired to ensure that an efficient quantity of resources is on hand to respond to any expected or abrupt change in demand based on shifting circumstances.

An efficient quantity of resources may represent the point where the amount of capacity to perform a task (e.g., deliveries, message transmission, etc.) meets the expected future need. The expected future need of a resource may depend on a number of dynamic variables that may be difficult to visualize or predict. For example, if the resource is employees, the expected future need for employees may depend on the growth rate of an organization. Employees may leave the organization and be unavailable to work. Employees in a current position performing a set of tasks may be promoted or demoted to a new position to perform a different set of tasks. Employees may also change locations such that the place where the task is performed is changed over time. Visualizing and predicting the impact of such variables on expected future need may be time consuming and resource intensive. For example, a manager in charge of hiring at a large organization may need to wait many weeks for independent input from various department chairs to understand the overall hiring needs of the organization.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to resource planning systems and methods for tracking, predicting, and simulating expected resource (e.g., employee) needs of an organization at a certain time horizon in the future. The simulations consider historical data collected by an entity (e.g., an organization) to predict the amount of a resource needed for a certain task or planning inputs provided from a planning device. By simulating the expected resource supply and demand for a resource under parameters provided by the planning device, the organization may properly reallocate resources or acquire an appropriate amount of the resource to respond to the circumstances.

Although the embodiments may reference employees for certain jobs, the simulation features may be applied to predict and plan for other task resources, human or machine, to perform additional or alternative tasks at specified times. For example, data transmissions at specific times may be offered to different transmission equipment. Each eligible piece of equipment may have unique capacity constraints that make it more likely that one transmitter is better suited to transmitting data from a specific location.

Figure 1:
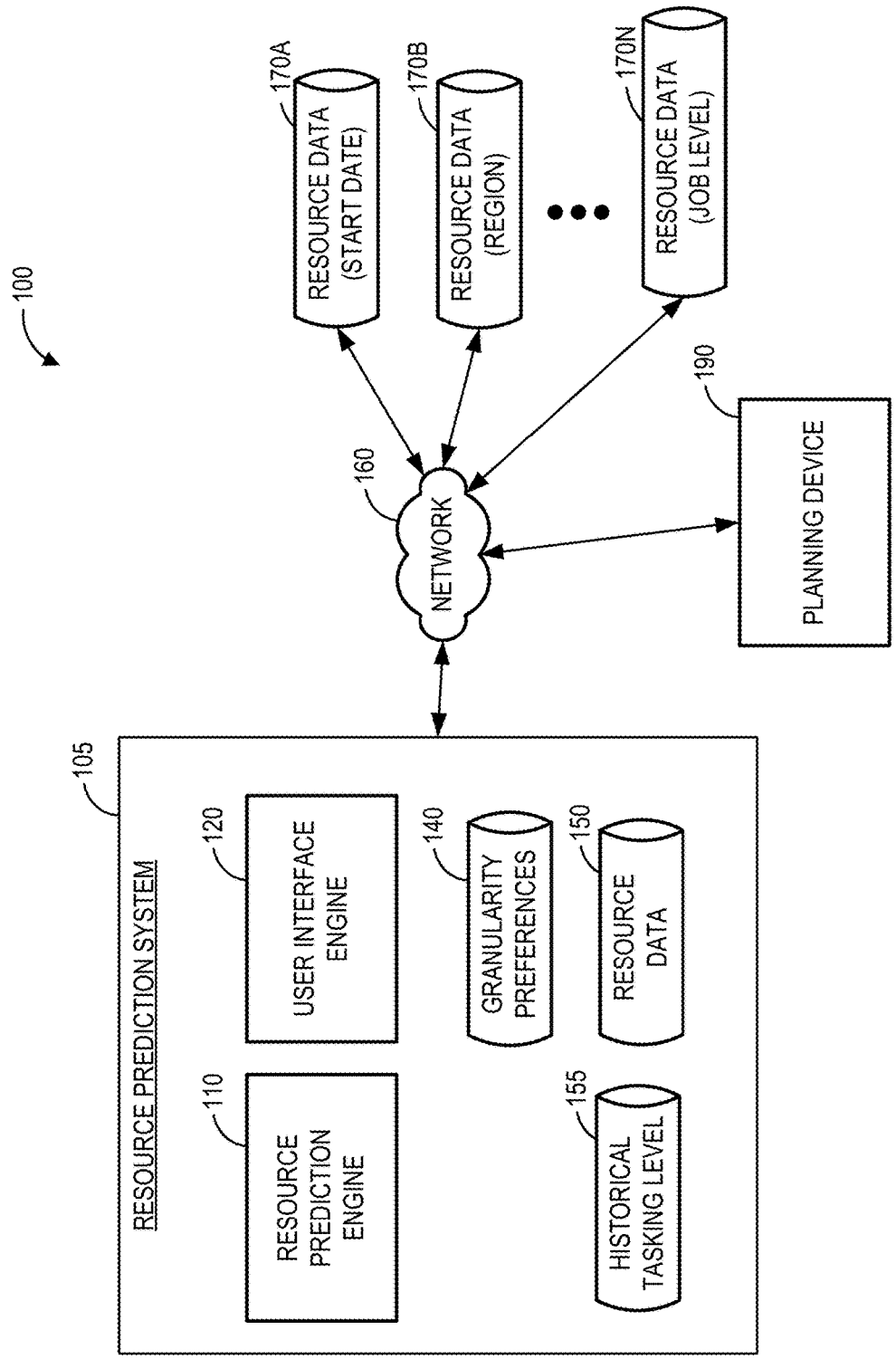
FIG. 1 is a block diagram depicting an illustrative operating environment for generating resource prediction simulations.

FIG. 1 is a block diagram depicting an illustrative operating environment for generating resource predictions. A resource prediction system 105 may generate resource predictions for a planning period. The planning period may be received as a planning parameter from a planning device 190. In some embodiments, the planning device may be a computer or a handheld mobile computing device. The planning period may indicate a period of time for which the resource planning is being performed. The resource predictions may include consideration of current resource levels, expected resource levels during the planning period, and expected resource demand during the planning period.

The predictions may be based on historical resource data for the resources. Examples of historical resource data include position start date 170A, region 170B, and job level 170N. The historical resource data may be stored in the environment 100 in one or more data stores accessible by the resource prediction system 105 directly or indirectly such as via a network 160. As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service or a data storage device.

The planning device 190 may be used to access the resource prediction system 105 to obtain resource predictions. The planning device 190 may be an electronic communication device configured to transmit machine readable messages via one or more wired or wireless communication protocols. Non-limiting examples of the planning device 190 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other electronic device or appliance. The messages may be formatted according to a standardized protocol such as transmission control protocol/Internet protocol (TCP/IP), hypertext transfer protocol (HTTP), file transfer protocol (FTP), or the like. The transmission may be sent via wireless or hybrid wired-wireless networks such as the network 160.

The network 160 may be any wired network, wireless network, or combination thereof. In addition, the network 160 may be a personal area network, local area network, wide area network, cable network, satellite network, cellular telephone network, etc. or combination thereof. For example, the network 160 may be a publicly accessible network of linked networks, possibly operated by various distinct parties, such as the Internet. In some embodiments, the network 160 may be a private or semi-private network, such as a corporate or university intranet. The network 160 may include one or more wireless networks, such as a Global System for Mobile Communications (GSM) network, a Code Division Multiple Access (CDMA) network, a Long Term Evolution (LTE) network, or some other type of wireless network. The network 160 may use protocols and components for communicating via the Internet or any of the other aforementioned types of networks.

A user interface engine 120 may be included in the resource prediction system 105. The user interface engine 120 may generate graphical interfaces for receiving planning requests from the planning device 190. The user interface engine 120 may generate graphical interfaces for presenting resource planning information via the planning device 190. For example, graphics may be included in a graphical interface to convey resource planning information. Examples of graphics include graphs, flow diagrams, charts, or tables. Further examples of such interfaces are described below such as with reference to FIGS. 4A, 4B, 5, and 6.

The resource prediction system 105 may retain configuration information for generating resource predictions or graphical interfaces related thereto. For example, in some implementations, resources may have different position titles or seniority levels but may perform the same task. In such instances, it may be desirable to define a granularity to aggregate the resources having any one of a series of titles or levels. Table 1 provides examples of two granularities. In Table 1, the granularities also take account of a location for the resource. This allows for different terminology used in different areas for describing resources to be consistently assessed across the entire organization.

TABLE 1

| Granularity | Resource Title | Resource Location |
| --- | --- | --- |
| Jr. Transmitter | Transmitter 1 | US |
| Jr. Transmitter | Entry Transmitter | EU |
| Jr. Transmitter | First Line | IN |
| Attorney | Patent Counsel | US |
| Attorney | Corporate Counsel | US |
| Attorney | Barrister | EU |
| Attorney | Solicitor | EU |

The resource prediction system 105 may include a data store 140 for maintaining the granularity preferences. For example, a user of the planning device 190 may initiate a planning session with the resource prediction system such as by providing a username or password. A planning input provided by the user may include custom granularity definitions. This allows the user to specify how resources will be grouped during the planning session.

A session generally refers to a series of communications between two or more devices or servers. A session may be associated with a session identifier (e.g., a planning session identifier). The session identifier may be included in messages exchanged to allow the session participants to associate specific messages with specific transactions. In this way, a server can concurrently provide resource prediction services to multiple communication devices by associating devices with a unique session identifier.

Other examples of granularity preferences include transition rates for each granularity. A transition rate may define a percent of resources for a granularity that will transition from the granularity to another state. The other state may be to a different position within the organization, to a different region, or termination of affiliation with the organization. The transition rate impacts the expected future supply of resources for the granularity and those positions to which resources may transition.

The resource prediction system 105 may store resource data in resource data store 150. The resource data store 150 may store historical resource data received via the network 160. In some implementations, the resource data store 150 may store processed historical resource data. For example, it may be desirable to normalize resource data received from across the organization. Normalization may include associating resource information for different resource titles into a single group.

To guide and ensure the accuracy of the resource planning, the resource prediction system 105 may also consider historical tasking levels. A historical tasking level may identify a quantity of work performed for a period of time. One example of a historical tasking level is topline shipped units. Topline shipped units is a metric used by catalog sales companies to indicate how many items were sent at a specified moment or period of time. The topline shipped units may be tracked by a fulfillment server or other computing device accessible by the resource prediction engine 110. This historical tasking level may be used by the resource prediction engine 110 to determine an expected demand for resources in the future.

Figure 2:
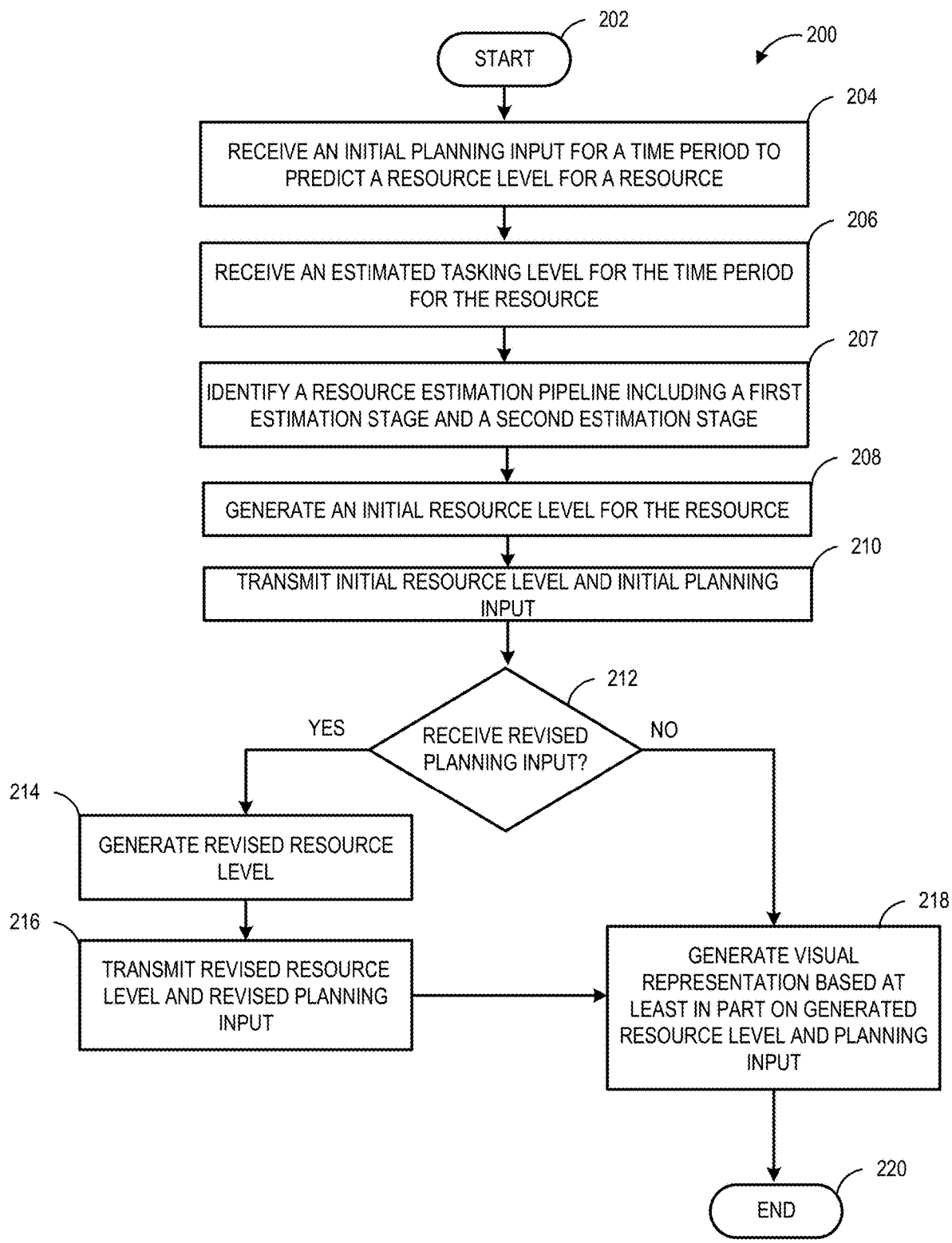
FIG. 2 is a flow diagram depicting an illustrative method of generating a resource prediction simulation from the perspective of the resource prediction system.

FIG. 2 is a flow diagram depicting an illustrative method of generating a resource prediction from the perspective of a resource prediction system. The method 200 may be implemented in whole or in part by one or more of the devices described herein, such as the resource prediction system 105 shown in FIG. 1. The method 200 demonstrates one way the resource prediction system 105 may efficiently predict and generate a visual representation of resource needs (e.g., number of employees needed to fill vacant positions) for a given planning period.

The method 200 begins at block 202. At block 204, the resource prediction system 105 receives an initial planning input for a time period to predict a resource level for a resource. The initial planning input may be received from a user interface such as one of those shown in FIGS. 4A, 4B, and 5. In some embodiments, initial planning input may identify a resource parameter to be applied to the simulation. For example, the initial planning input may include a dwell time parameter (e.g. 6 months in a particular position) applied to employees in the simulation, a demand forecast parameter predicting an expected demand for employees at a time period in the future, an attrition rate parameter determining a termination (e.g., voluntary or involuntary) rate for employees, a promotion rate indicating a predicted rate of promotion for employees within a time period, an external hires parameter predicting the number of external hires at a point in the future, and a total number of resources for a particular granularity, job level, or region at a time period in the future. The initial planning input may also include a period of time for planning (e.g., a time horizon of five years into the future).

The method 200 continues to block 206, where the user interface engine 120 may receive an estimated tasking level for the time period for the resource. The estimated tasking level may identify resource by granularity, location, level, or other resource filtering criterion. The estimated tasking level may be received from a data store including forecasted tasking levels. The estimate tasking level may be dynamically generated by providing the time period and resource information. Historical resource data may be retrieved and used to extrapolate the expected levels during the time period. For example, an average rate of change may be assessed for a historic period of time. This rate may then be applied to current tasking levels to generate the estimated tasking level. The tasking level may be assessed based on number or resources, units of worked performed using a set of resources (e.g., how many items are shipped by resource), or other measurable features of the organization.

At block 207, the resource prediction system may identify a resource estimation pipeline to generate an initial resource level for the resource. In some embodiments, the resource estimation pipeline may be partitioned into multiple stages. For example, a resource estimation pipeline may include a first estimation stage for receiving a planning input and a second estimation stage for receiving an output of the first estimation stage.

At block 208, the resource prediction system may generate an initial resource level for the resource according to the resource estimation pipeline based at least in part on the initial planning input and estimated tasking level for the time period. In some embodiments, the initial resource level may be based upon historical data previously calculated, predicted, or stored by the organization relating to the particular resource in a computer-readable storage memory. In some embodiments, the initial resource level may be determined according to an equation calculating probabilities related to a resource in a particular circumstance or granularity. Once an initial resource level for the resource has been generated at block 208, the resource prediction system may transmit the initial resource level and initial planning input to the planning device at block 210.

At block 212, the resource prediction system may determine whether a revised planning input has been received from the planning device. In some embodiments, the revised planning input may include additional parameters not previously supplied to the resource prediction system or revised values for existing parameters for a resource. In some embodiments, the revised planning input may also include an adjustment to the time period for the resource. In some embodiments, a change in one planning input may automatically cause a change in other planning inputs. The change in one planning input may be subjected to a constraint such that a group of inputs must correspond to a constraint value. For example, if a user increases the promotion probabilities for each of the calendar years in the time period, other probabilities, such as transfer, retention, voluntary terminations (e.g., due to resource departure), and involuntary termination (e.g., by request of the organization) probabilities may also be adjusted such that the sum of the probabilities is one. If the resource prediction system has received a revised planning input, the resource prediction system may generate a revised resource level based at least in part on the revised planning input at block 214. In some embodiments, the resource prediction system may identify a resource estimation pipeline for the revised planning input. For example, the resource prediction system may bypass the first estimation stage and determine that the revised planning input is used by the second estimation stage when generating the revised resource level. Because the second estimation stage may depend on the output of the first estimation stage, if a change is made to an input to the first estimation stage, the output from the first estimation stage may also change. However, if the planning input did not change, the output of the first estimation stage may not differ for the second execution of the resource estimation pipeline. In such instances, the first estimation stage may be bypassed. Once the resource prediction system has generated the revised resource level at block 214, the resource prediction system may transmit the revised resource level and revised planning input to the planning device at block 216.

In the example process shown in FIG. 2, the resource prediction system continues by generating a visual representation based at least in part on the generated resource level and the planning input at block 218. In some embodiments, the visual representation may be based upon historical data or a planning input provided by the planning device. In some embodiments, the visual representation may be in the form of a graph plotting expected resource demand or supply throughout a set time horizon. In some embodiments, the visual representation may also visually indicate gaps between predicted resource supply and resource demand throughout the time horizon. As will be discussed further in FIGS. 4A, 4B, and 5, example visual representations may provide a variety of user interface controls such as sliders, buttons, tabs, tables, charts, or other control elements that a user may interact with to alter planning inputs or resource parameters. In some embodiments, the resource prediction system may generate the visual representation according to certain planning inputs. For example, a user may elect to generate the visual representation specifically as a bar graph by checking a box that says "display results as a bar graph."

Figure 3:
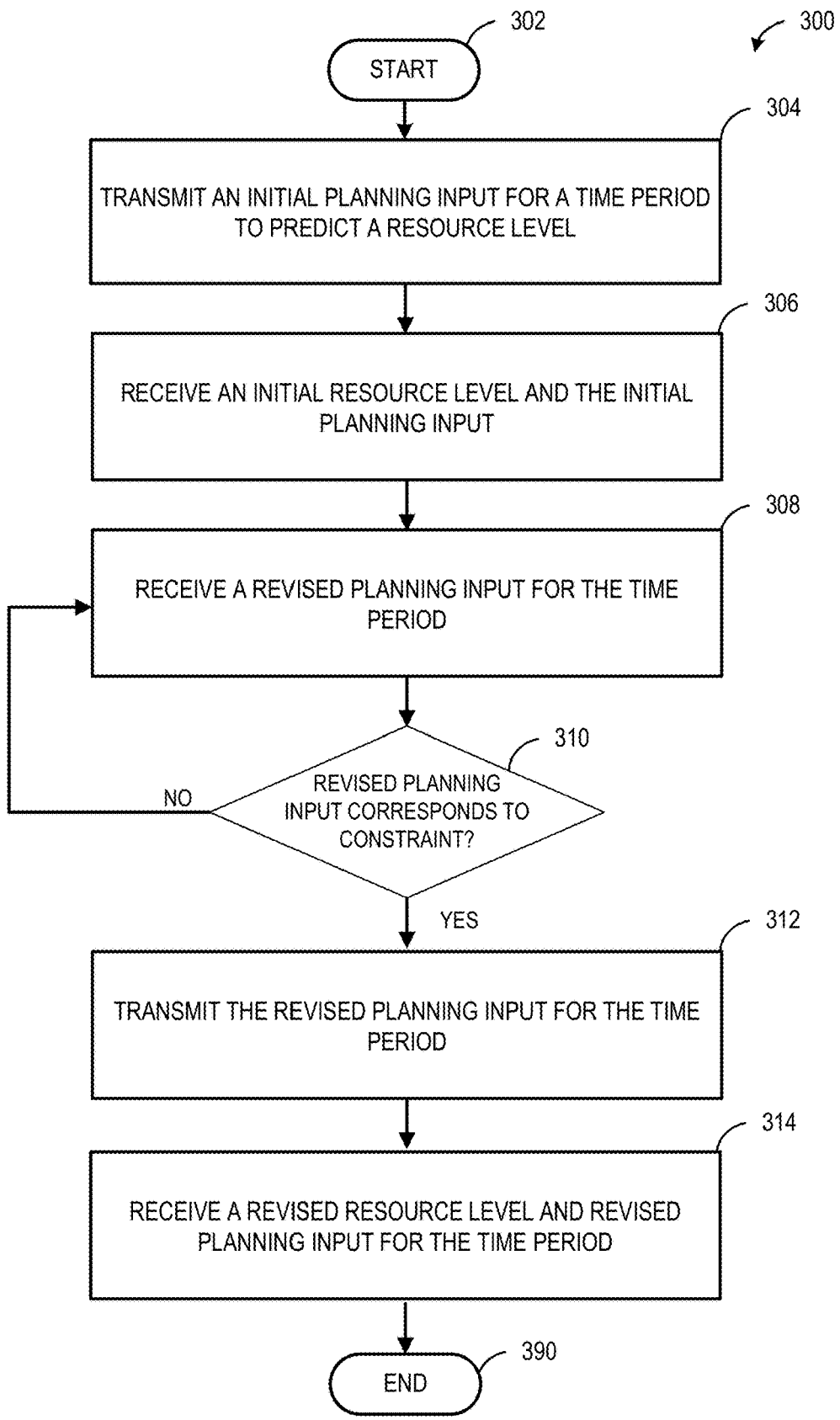
FIG. 3 is a flow diagram depicting an illustrative method of generating a resource prediction simulation from the perspective of the planning device.

FIG. 3 is a flow diagram depicting an illustrative method of generating a resource prediction simulation from the perspective of the planning device. The example process shown in FIG. 3 reflects a similar process as described with reference to FIG. 2 except from the perspective of the planning device. The method 300 begins in block 302. At block 304, the planning device may transmit to a resource prediction system an initial planning input for a time period to predict a resource level. In some embodiments, the initial planning input may comprise historical data of a resource that has been previously tracked, predicted, or stored by an organization. In some embodiments, the initial planning input may comprise parameters associated with a resource (e.g., attrition rate for employees at the organization). At block 306, the planning device may receive from the resource prediction system an initial resource level and the initial planning input after the resource prediction system has generated an initial resource level based at least in part on the initial planning input transmitted by the planning device at block 304.

After receiving an initial resource level and the initial planning input, the planning device may then receive a revised planning input for the time period at block 308. At block 310, the planning device determines whether the received revised planning input corresponds to a constraint associated with the planning input. For example, a promotion rate planning input for employees at a certain job level may have a constraint level ranging from 0% to 100% and may only accept revisions to the promotion rate if the revised percentage is within that range. If the revised planning input is not within an acceptable constraint level, the method 300 may return to block 308 until the planning device receives a revised planning input corresponding to the constraint. In some embodiments, one or more processors may be configured to execute specific executable instructions to at least adjust the value of a planning input to a value within an acceptable constraint level.

Once the planning device receives a revised planning input within a set constraint level associated with the planning input, the planning device may, at block 312, transmit the revised planning input related to the resource. For example, if the initial planning input provided for a 6-month dwell time for employees in the organization, the revised planning input may alter the dwell time parameter to a period of 12 months. Assuming that the revised dwell time parameter of 12 months is within an acceptable constraint level for the dwell time parameter, the revised dwell time parameter may be transmitted to the resource prediction system. After transmitting the revised planning input to the resource prediction system for analysis, the planning device may receive a revised resource level and the revised planning input for the time period from the resource prediction system in block 314. In some embodiments, the received transmission from the resource prediction system may also include a visual representation based at least in part on the resource level and planning input provided by the planning device. The method 300 ends in block 390.

Figure 4A:
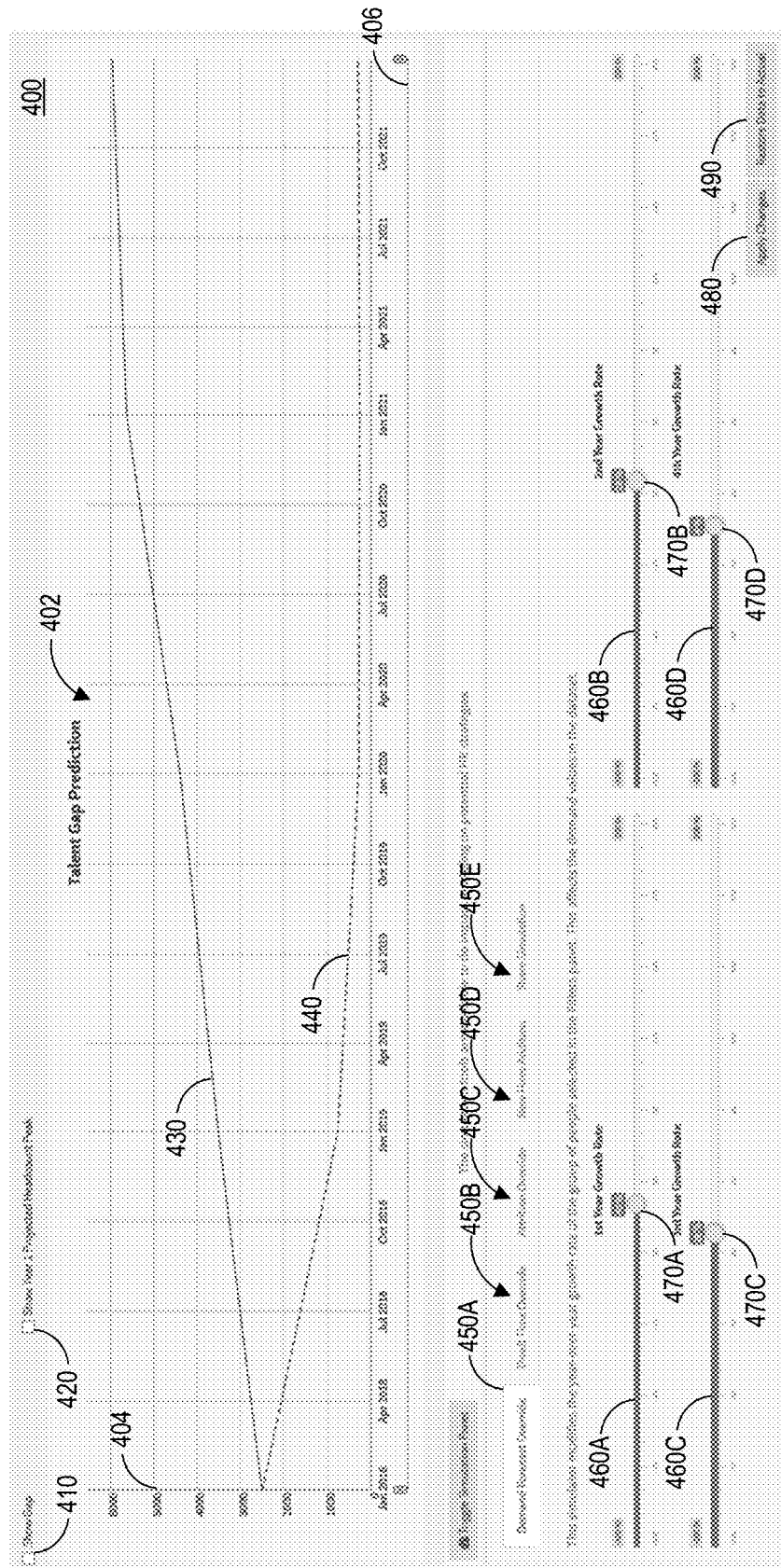
FIG. 4A is a diagram depicting an example interface for resource prediction simulation before changes are simulated.

FIG. 4A is a diagram depicting an example interface for resource prediction simulation before changes are simulated. The user interface 400 may be presented via the planning device 190 using a specific application for predictive resource planning or a general purpose application such as a network browser, or through the user interface engine 120. The user interface 400 may include control elements or visual representations that summarize and present resource planning information in a particular manner that allows, for example, interactive and iterative planning over a network using the planning device 190. For example, the user interface embodied in FIG. 4A provides a variety of checkboxes 410 and 420, buttons 480 and 490, tabs 450A, 450B, 450C, 450D, and 450E, and sliders 470A, 470B, 470C, and 470D that the user may interact with to affect a graph 402.

In some embodiments, the user interface 400 may visually represent data in the form of the graph 402. For example, the graph 402 illustrates resource predictions by including a horizontal time axis 406 and a vertical resource count axis 404. The graph 402 may also include one or more trend lines such as a resource demand trend line 430 and a resource supply trend line 440. The trend lines may be dynamically presented. For example, the interface may include a "show gap" control element such as checkbox 410. If the checkbox 410 is selected, a resource gap representing the difference between resource demand trend line 430 and resource supply trend line 440 may be presented. If unselected, the resource gap may be hidden from the graph 402. In some implementations, a "show year 1 projected headcount peak" control element, such as the checkbox 420, may also be selected to show a predicted maximum number of a resource (e.g., employees) in a particular time period.

The user interface 400 may also categorize information and planning inputs into tabs. By way of example, demand forecast override tab 450A contains first year growth rate range 460A, second year growth rate range 460B, third year growth rate range 460C, and fourth year growth rate range 460D. Each growth rate is a planning input that may affect the resource prediction as well as the appearance of resource demand trend line 430 and resource supply trend line 440 in graph 402. A user may provide or revise the planning inputs by moving sliders 470A, 470B, 470C, and 470D to a desired value. As a value is changed, the updated value may be transmitted to the resource prediction system for generation of a revised resource prediction and corresponding user interface updates (e.g., changing the graph 402). Additional tabs 450B, 450C, 450D, and 450E may also include various sliders or ranges that may be manipulated to affect the graph 402. In some embodiments, the graph 402 may dynamically adjust to reflect any change to the planning inputs in real time. In other embodiments, graph 402 may not update to reflect changes to planning inputs unless the user utilizes the "apply changes" button 480. In some embodiments, raw data such as historical resource levels, predicted resource levels, or planning input values may be displayed in a tab similar to tabs 450A-E.

Though the user interface 400 is a powerful tool that allows iterative and dynamic simulation of various scenarios, it may be desirable to revert any changes to the default values used to generate the initial resource prediction. In some embodiments, the user interface 400 may provide a button 490 that may undo the changes to various planning inputs back to an initial or default values used to generate the initial resource prediction. In some embodiments, the resource prediction system may receive, from a planning device, a reset message. The resource prediction system may generate a revised planning input, wherein the revised planning input is an initial planning input of a planning session. The resource prediction system may also generate a revised resource level, wherein the revised resource level is the initial resource level of a planning session. The resource prediction system may generate a visual representation based at least in part on the revised planning input and revised resource level and transmit the visual representation to the planning device.

Figure 4B:
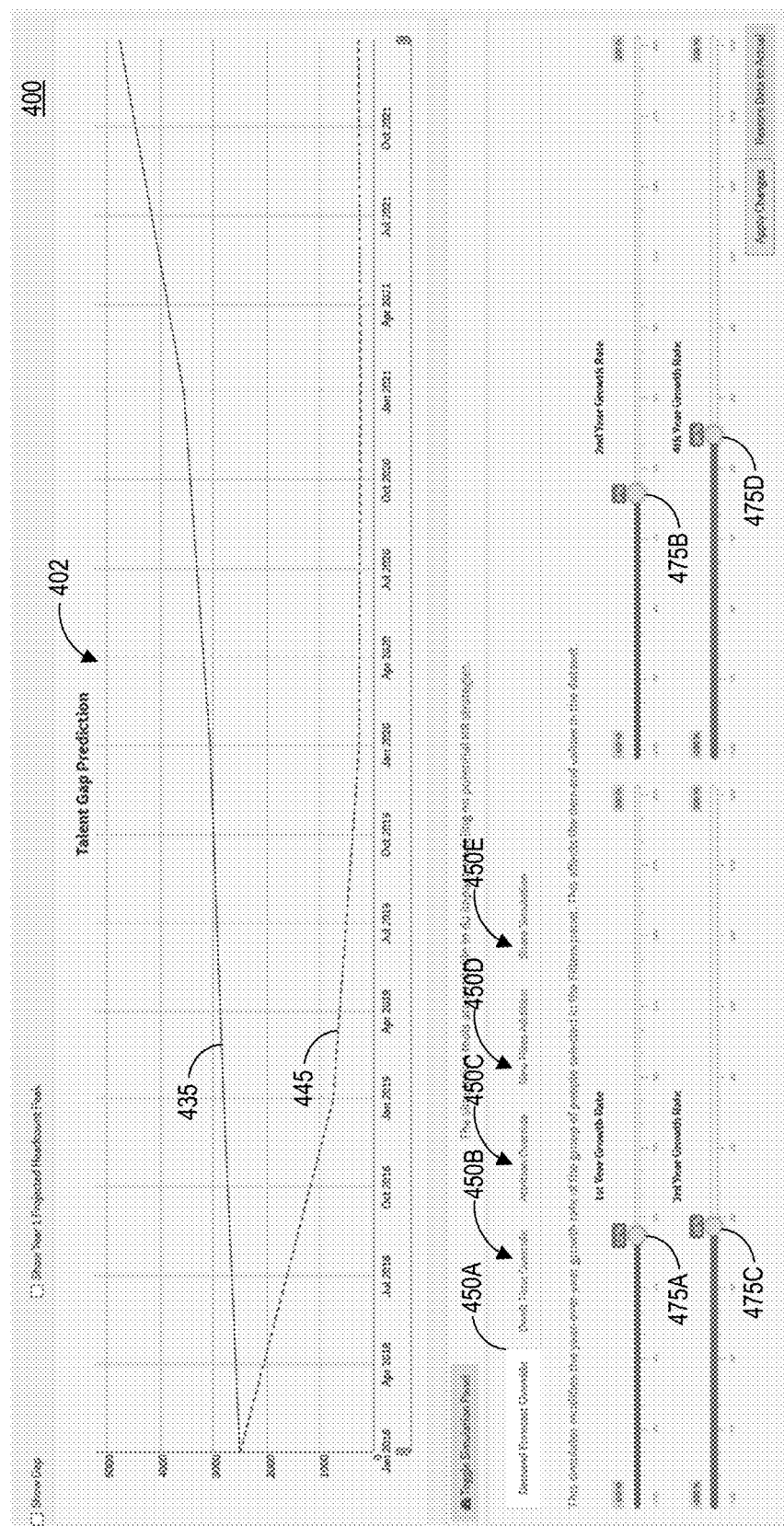
FIG. 4B is a diagram depicting an example interface for resource prediction simulation after changes are simulated.

FIG. 4B is a diagram depicting an example interface for resource prediction simulation after changes are simulated. The particular interface embodied in FIG. 4B is similar to the user interface 400 embodied in FIG. 4A. However, the values in FIG. 4B for the planning input sliders 475A, 475B, 475C, and 475D are revised to reflect different values than in FIG. 4A. In some embodiments, the graph 402 may display a revised resource demand 435 and a revised resource supply 445 based at least in part on the sliders 475A, 475B, 475C, and 475D. In some embodiments, changes to the planning inputs may persist when the user swaps between tabs displayed on the user interface 400. By way of example, if the user adjusts slider 475A from 12% to 50% and subsequently views another tab (e.g., tab 450B, tab 450C, tab 450D, or tab 450E), slider 475A may maintain its revised value of 50% when the user swaps back to tab 450A. In some embodiments, the user interface 400 may display changes to the graph 402 on the same page by updating the graph 402 based at least in part on one or more revised planning inputs. In other embodiments, the user interface engine or resource prediction system may generate a new window or new graph to reflect the new simulation. In some embodiments, specific simulations or changes may be encoded in conjunction with custom input values such as parameters of a specific Uniform Resource Locator (URL) or a data file. The encoded value(s) may be transmitted across a data network to another device. The other device may present the encoded value(s) to generate a visual representation of the simulation for a specific simulation along with any changes made during a planning session.

Similar to how a user may wish to utilize multiple tabs in a single simulation, the user may also wish to run multiple simulations simultaneously. In some embodiments, a change to a planning input in one simulation may affect the visual representation for that simulation as well as other open simulations that contain the planning input. For example, if the user interacts with a slider to decrease or increase the average dwell time of employees within the organization in one graph or simulation, open graphs and simulations are updated to reflect the revised planning input in one of the simulations.

Figure 5:
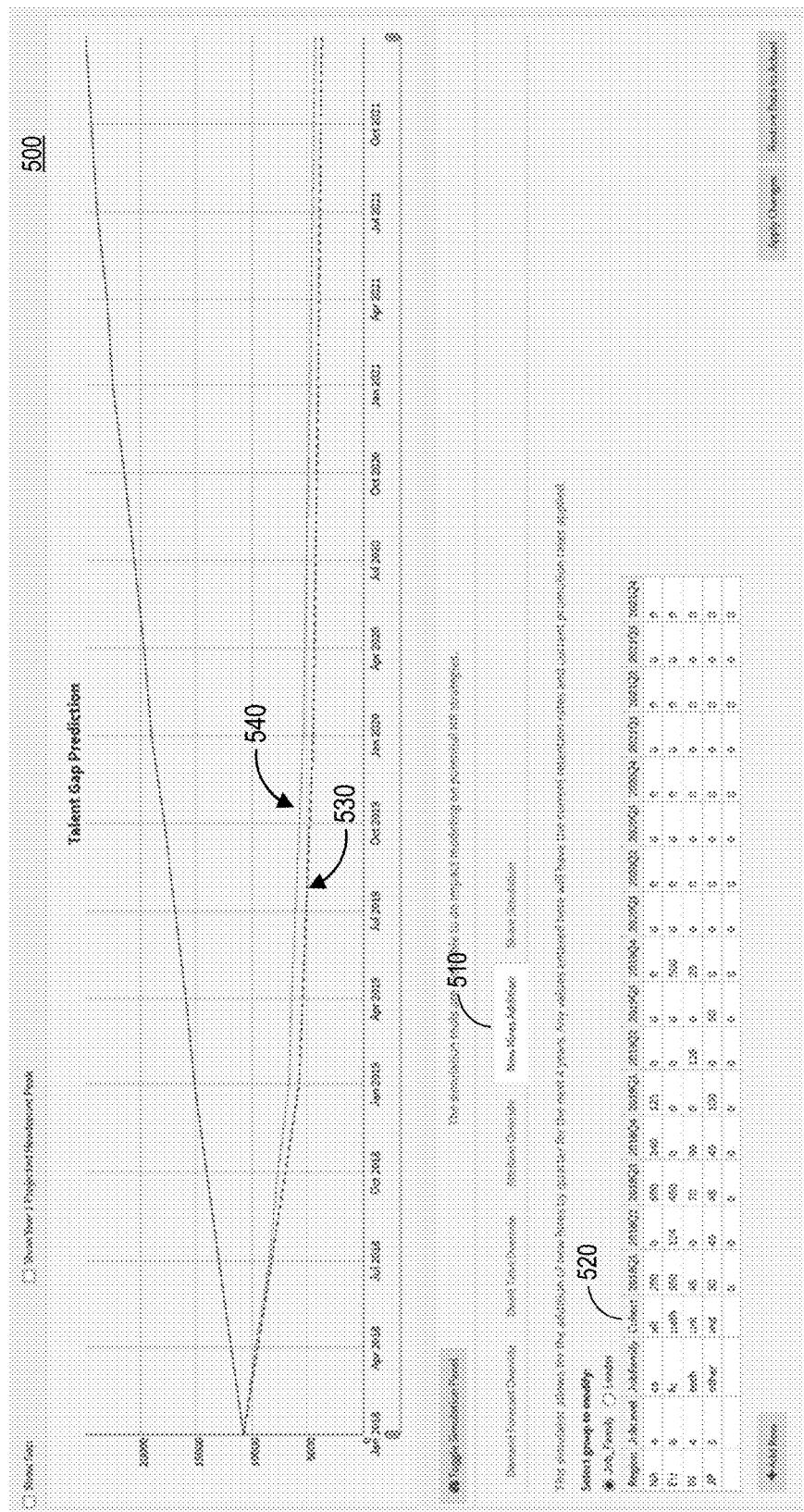
FIG. 5 is a diagram depicting an example interface for resource prediction simulation.

FIG. 5 is a diagram depicting an example interface for resource prediction simulation. Similar to the interface shown in FIGS. 4A and 4B, the user interface 500 displays a simulation of predicted levels of a resource based at least in part on various planning inputs. How the user interacts with planning inputs may vary across embodiments. For example, the particular embodiments represented in FIGS. 4A and 4B allowed the user to revise planning input values by moving a slider across a range of values. In some embodiments, such as the one portrayed in FIG. 5, the user may revise or adjust planning values by manually entering a desired value for a parameter in table 520. The user interface 500 may visually indicate changes to simulated resource levels on a graph. By way of example, resource supply 540 represents a simulated resource level given certain changes to the new hires planning input in tab 510 while resource supply 530 represents a previous simulated resource level before revising the new hires planning input.

Figure 6:
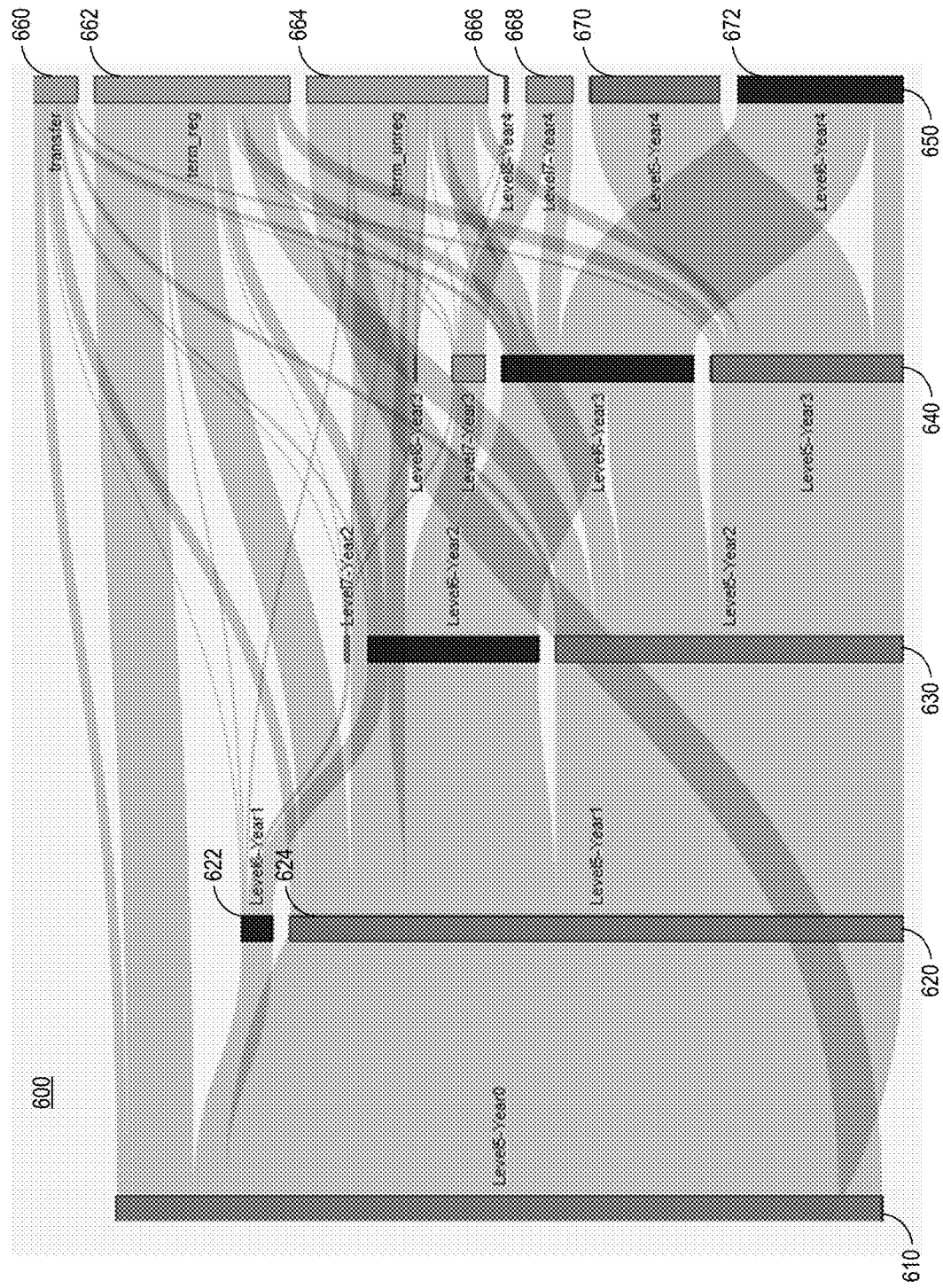
FIG. 6 is a diagram illustrating an example visual representation illustrating the flow of employees in an organization over a time period.

FIG. 6 is a diagram illustrating an example visual representation illustrating the flow of employees in an organization over a time period. The visual representation 600 may track the flow of a resource (e.g., employees or physical equipment) in a variety of ways according to a specified resource need during a period of time. In some embodiments, the visual representation may display the flow of employees according to a career flow model. For example, a career flow model may display the flow for different cohorts of employees starting from the specific hire date of each employee at a particular job level and may track how many employees get promoted, demoted, transferred, or leave each year. The visual representation of a cohort's job level outcomes may help organizations identify the trends for each different cohort and analyze or determine areas for improvement.

The flow embodied in FIG. 6 displays a career flow model for employees in North America at job level 5. The organizational information presented in FIG. 6 and throughout this application is provided as an example for illustrative purposes and does not reflect actual information related to an actual organization. The flow begins at time period 610 when each employee in the job level 5, North America cohort begin their positions. Each time period may be represented by one or more bars. The bars may be rendered with a size that corresponds to a portion of the resources associated with a bar. A given bar may represent a specific granularity for the resource at the associated point in time. As the flow progresses to time period 620, the flow may indicate that a portion 622 of employees that began at job level 5 promote to level 6 while a portion 624 of the employees remain at job level 5. The flow progresses to time period 630, visually representing an increased proportion of employees transitioning to level 6 and a small portion of employees graduating to level 7. At time period 640, the visual representation 600 displays a portion of employees who have graduated to level 8, 7, 6, or remain at level 5. At time period 650, the flow visually represents the outcome of the cohort that initially began at level 5: portion 670 represents the portion of employees remaining at level 5 after four years, portion 672 represents the portion of employees who graduated to level 6, portion 668 represents the portion of employees who graduated to level 7, portion 666 represents the portion of employees who graduated to level 8, portion 660 represents the portion of employees who transferred to a different department or region, portion 664 represents the portion of employees who left the organization voluntarily, and portion 662 represents the portion of employees who were terminated within four years.

In some embodiments, the flow of resources may be visually represented according to a calendar flow model. Rather than beginning at a cohort's hiring date, the calendar flow model may begin from the current day and project towards the future. For example, the calendar flow model tracking employee progression may display the percentage of people who are currently at job level 6 and see how many people will promote to level 7 one year from the current date.

In some embodiments, the resource prediction system may output a visual representation in the form of a career flow model or calendar flow model by default. In some embodiments, the visual representation output may change according to revisions to one or more planning inputs. For example, the planning input may include a checkbox specifying that the resource prediction system output a simulation in the form of a career flow model.

Though FIG. 6 does not display the various control elements previously discussed in FIGS. 4A, 4B, and 5, the visual representation 600 may change according to revisions in planning inputs. In some embodiments, the appearance of the flow model may change according to revisions to the planning inputs. By way of example, a revised promotion rate of 0% across employees in the positions would change visual representation 600 such that no employee starting from the position represented by the block at time period 601 would ever promote to a higher job level. Therefore, assuming no employee leaves, transfers, or is terminated, there would be no change in the predicted number of employees at job level 5 from time period 610 through 650, and portions 660, 662, 664, 666, 668, and 672 would no longer be included in time period 650.

Figure 7:
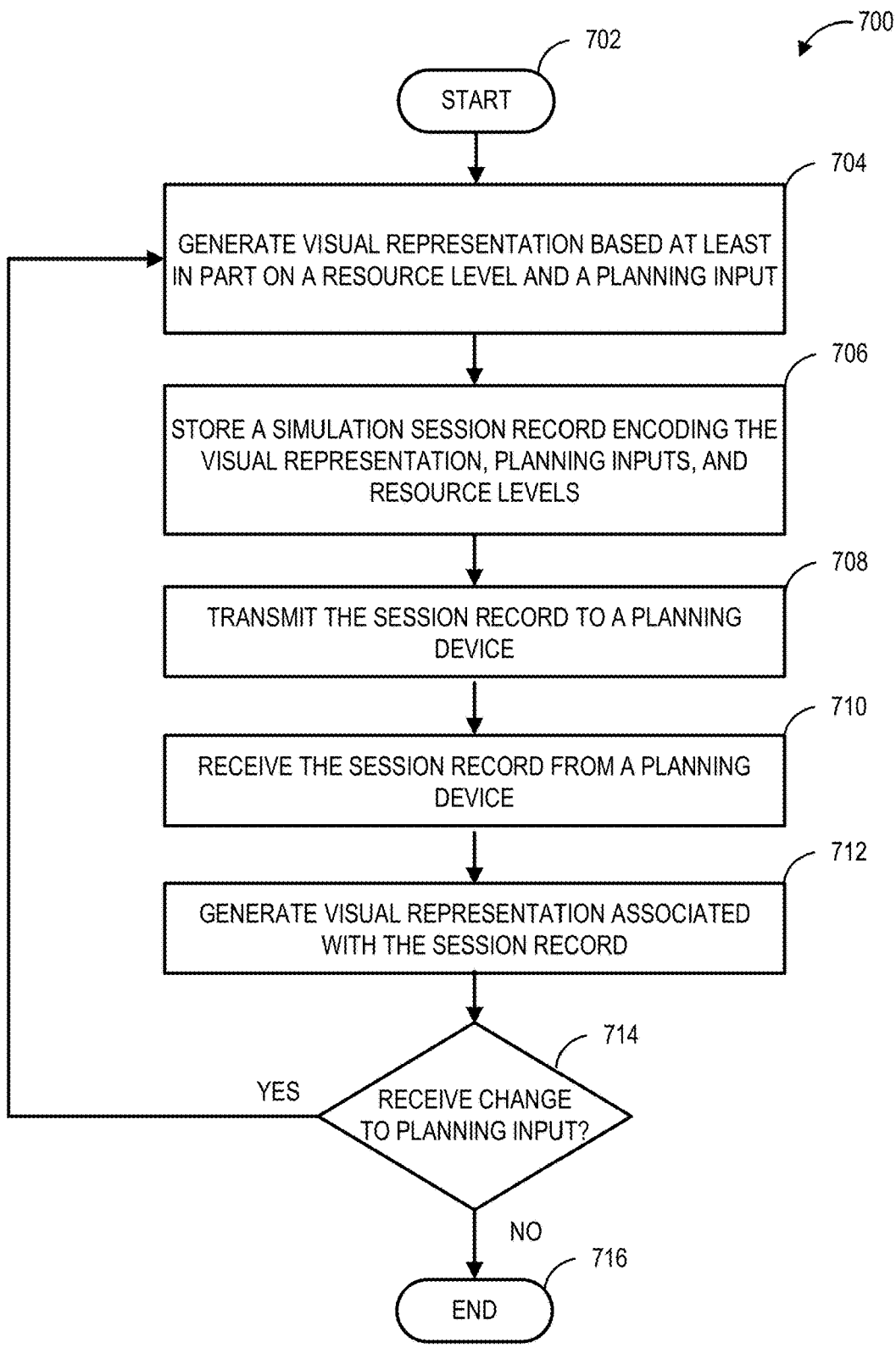
FIG. 7 is a flow diagram depicting an illustrative method of storing simulations.

FIG. 7 is a flow diagram depicting an illustrative method of storing simulations. The example method 700 begins at block 702. At block 704, the resource prediction system may generate a visual representation of a resource level over a time period based at least in part on a predicted resource level and a planning input. As discussed in FIGS. 4A, 4B, 5, and 6, the resource prediction system may generate the visual representation as a series of graphs, tables, flows, or other visual representations or arrangement of data. Once the resource prediction system has generated the visual representation at block 704, the system may store a simulation session record encoding the planning inputs, resource levels, and visual representation at block 706 in a computer-readable memory or data store. In some embodiments, the session record may be stored as a Uniform Resource Locator (URL) link, an image file, a text document, an executable file, or other form of storage. The stored session record may also comprise a list, record, or ordered set of all changes to planning inputs in the current simulation session listed in chronological or sequential order. The list, record, or ordered set of changes to the planning inputs may be stored in a variety of ways. By way of example, in some embodiments, the order of changes may be represented as a linked list data structure comprising connected nodes, wherein each node comprises a set of changes to one or more planning inputs and a pointer connecting the node to another node in the linked list.

In some embodiments, the stored session record may be associated with security features such as a username or password. One or more processors may be configured to grant access permissions to the content of the stored session record upon receipt of the username or password. In some embodiments, access permissions may be valid on a limited basis, such as for a period of time or a number of uses. For example, a password used to access the stored session record may automatically expire six hours after it is issued or after the password is used ten times. Once the session has been stored, the resource prediction system may transmit the session record to a planning device or third party device at block 708. In some embodiments, the session record may be transferred via a wireless data network, wired data network, or hybrid wired-wireless networks.

Once the resource prediction system has transmitted the session record to a planning device at block 708, the resource prediction system may receive the particular link or file associated with the specific planning inputs, resource levels, and visual representations associated with the session record at block 710. For example, the resource prediction system may transmit a specific URL associated with the particular simulation to a planning device, and the user of the planning device may transmit the URL back to the resource prediction system for retrieval of a stored instance of the simulation or to generate a new visual representation based at least partly on the session record containing specific planning inputs and time horizons at block 712.

In some embodiments, the visual representation may be generated according to a list, record, or ordered set of changes to planning inputs in the current simulation session stored in the session record. For example, if the stored session record included a linked list structure comprising an ordered set of nodes representing changes to various planning inputs, a first visual representation may be generated based at least in part on parameters stored in the first node, a second visual representation may be generated based at least in part on parameters in a second node, and so on. In some embodiments, the generated visual representation may include various control options to allow a user to revise or alter various planning inputs. If the simulation system receives a change to a planning input at decision block 714, the method 700 may return to block 704 to generate a new visual representation based at least in part of the revised planning input and predicted resource level. If there is no change to a planning input, then the process ends at block 716.

Figure 8:
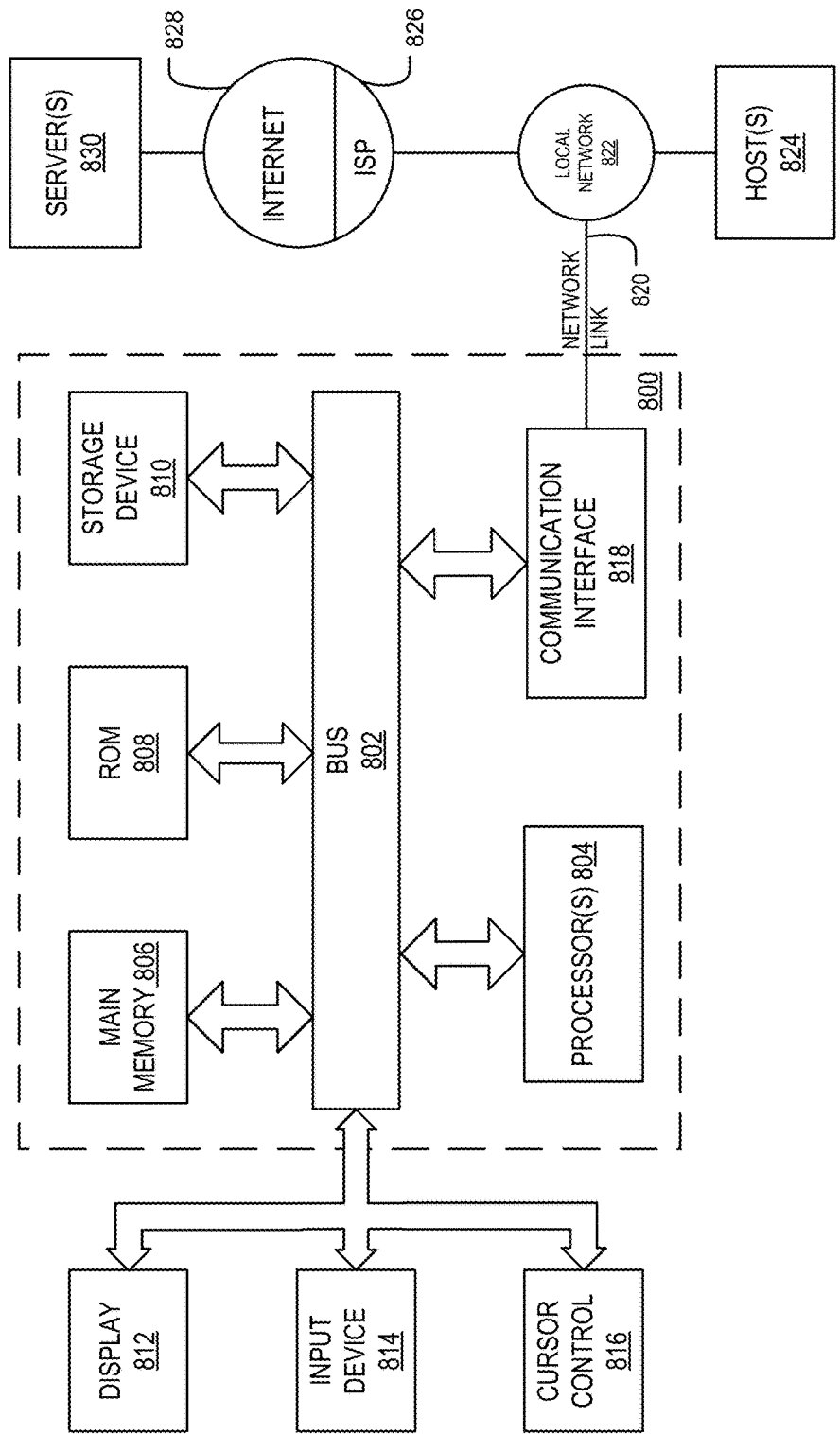
FIG. 8 is a block diagram of an illustrative computing system that may implement one or more of the features described.

FIG. 8 is a block diagram of an illustrative computing system that may implement one or more of the features described. The computing system 800 may be configured to perform all or some of the features of the resource prediction system 105. The computing system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

The computing system 800 also includes a main memory 806, such as a random access memory (RAM), cache, or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render the computing system 800 into a special-purpose machine that is customized to perform the operations specified in the instructions.

The computing system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computing system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as computer executable program instructions that are executed by the computing device(s). The computing system 800 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 800 to be a special-purpose machine. According to one embodiment, the techniques herein may be performed by the computing system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to the computing system 800 can receive the data on the telephone line and use an infra-red transmitter to convert the data to an infra-red signal. An infra-red detector can receive the data carried in the infra-red signal and appropriate circuitry can place the data on the bus 802. The bus 802 carries the data to main memory 806, from which processor 804 retrieves and executes the instructions. The instructions received by main memory 806 may optionally be stored on storage device 810 either before or after execution by processor 804.

The computing system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from the computing system 800, are example forms of transmission media.

The computing system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Various features for dynamic resource prediction simulation have been described. The features described may be embodied as a computer-implemented method performed under control of one or more processors. The method includes receiving, from a planning device, an initial planning input for a time period to predict a resource level for a resource. The method includes receiving, from the planning device, an estimated tasking level for the time period for the resource. The method includes generating an initial resource level for the resource based at least in part on the estimated tasking level and the initial planning input. The method includes transmitting, to the planning device, the initial resource level and the initial planning input. The method includes receiving, from the planning device, a revised planning input for the time period. The method includes generating a revised resource level for the resource based at least in part on the estimated tasking level and the revised planning input. The method includes transmitting, to the planning device, the revised resource level and the revised planning input. The method includes generating a visual representation based at least in part on the revised resource level and revised planning input. The method includes transmitting the visual representation to the planning device.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a resource prediction system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A resource prediction system can be or include a microprocessor, but in the alternative, the resource prediction system can be or include a controller, microcontroller, or state machine, combinations of the same, or the like configured to estimate and communicate prediction information. A resource prediction system can include electrical circuitry configured to process specific, computer-executable instructions. Although described herein primarily with respect to digital technology, a resource prediction system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a resource prediction system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the resource prediction system such that the resource prediction system can read information from, and write information to, the storage medium. In the alternative, the storage medium can be integral to the resource prediction system. The resource prediction system and the storage medium can reside in an ASIC. The ASIC can reside in a user terminal. In the alternative, the resource prediction system and the storage medium can reside as discrete components in a user terminal (e.g., planning device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™ .NET™, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A resource planning system comprising:
a computer-readable memory storing specific executable instructions; and
one or more computer processors in communication with the computer-readable memory, wherein the one or more computer processors are configured to execute the specific executable instructions to at least:
receive, from a first planning device, an initial planning input for a time period to predict a resource level for a resource;
receive, from the first planning device, an estimated tasking level for the time period for the resource;
identify a resource estimation pipeline including a first estimation stage for receiving a planning input and a second estimation stage for receiving an output of the first estimation stage;
generate an initial resource level for the resource based at least in part on the estimated tasking level and the initial planning input as processed by the resource estimation pipeline;
transmit, to the first planning device, the initial resource level and the initial planning input;
receive, from the first planning device, a revised planning input for the time period;
generate a revised resource level for the resource based at least in part on the estimated tasking level and the revised planning input as processed by the resource estimation pipeline;
generate a visual representation based at least in part on the revised resource level and revised planning input, wherein the visual representation illustrates the revised resource level over the time period;
encode the visual representation, the revised planning input, and the revised resource level into a simulation session record;
retrieve, based at least in part on the simulation session record: the visual representation, the revised resource level, and the revised planning input;
transmit, to a second planning device, the visual representation, the revised resource level, and the revised planning input;
create, in response to receiving the initial planning input, a planning session identifier to uniquely identifying a planning session with the planning device;
store, in a data storage device, the initial planning input in association with the planning session identifier;
receive, from the second planning device, a reset message, wherein the reset message includes the planning session identifier;
retrieve the initial planning input from the data store based at least in part on the planning session identifier;
generate an updated resource level based at least in part on the initial planning input, wherein the updated resource level corresponds to the initial resource level of the planning session; and
generate instructions to present an updated visual representation based at least in part on the initial planning input and the updated resource level.

2. The resource planning system of claim 1, wherein the one or more computer processors are configured to execute the specific executable instructions to at least:
determine that the revised planning input is used by the second estimation stage; and
bypass the first estimation stage when generating the revised resource level.

3. A system comprising:
a computer-readable memory storing specific executable instructions;
one or more computer processors in communication with the computer-readable memory, wherein the one or more computer processors are configured to execute the specific executable instructions to at least:
receive, from a planning device, an initial planning input for a time period to predict a resource level for a resource;
receive, from the planning device, an estimated tasking level for the time period for the resource;
generate an initial resource level for the resource based at least in part on the estimated tasking level and the initial planning input;
transmit, to the planning device, the initial resource level and the initial planning input;
receive, from the planning device, a revised planning input for the time period;
generate a revised resource level for the resource based at least in part on the estimated tasking level and the revised planning input;
generate instructions to present a visual representation based at least in part on the revised resource level and revised planning input, wherein the visual representation illustrates the revised resource level over the time period;
encode the visual representation, the revised planning input, and the revised resource level into a simulation session record;
transmit the simulation session record to the planning device;
create, in response to receiving the initial planning input, a planning session identifier to uniquely identifying a planning session with the planning device;
store, in a data storage device, the initial planning input in association with the planning session identifier;
receive, from the planning device, a reset message, wherein the reset message includes the planning session identifier;
retrieve the initial planning input from the data store based at least in part on the planning session identifier;
generate an updated resource level based at least in part on the initial planning input, wherein the updated resource level corresponds to the initial resource level of the planning session; and
generate instructions to present an updated visual representation based at least in part on the initial planning input and the updated resource level.

4. The system of claim 3, wherein the simulation session record comprises at least one of a Uniform Resource Locator (URL) link, an image file, a text document, or an executable file.

5. The system of claim 4, wherein the simulation session record is associated with a username or password, and wherein the one or more processors are configured to execute specific executable instructions to at least permit access to the simulation session record upon receipt of the username or password.

6. The system of claim 3, wherein the one or more processors are configured to execute further specific executable instructions to at least identify a resource estimation pipeline including a first estimation stage for receiving a planning input and a second estimation stage for receiving an output of the first estimation stage.

7. The system of claim 3,
wherein the initial planning input comprises historical data of the resource collected or stored by an entity;
wherein the initial resource level is based at least partly on the historical data of the resource provided by an entity; and
wherein the revised planning input comprises custom input of resource parameters from the planning device.

8. The system of claim 3, wherein the initial planning input comprises at least one of a demand forecast, dwell time, attrition rate, external hires, and number of resources in an organization.

9. The system of claim 3, wherein the one or more processors are configured to execute further specific executable instructions to at least:
associate the revised planning input and a second planning input with a constraint value;
determine that the revised planning input and the second planning input do not correspond with the constraint value; and
adjust the second planning input such that the revised planning input and the second planning input correspond with the constraint value.

10. The system of claim 9, wherein the one or more processors are configured to execute further specific executable instructions to adjust the second planning input upon detecting the revised planning input.

11. The system of claim 3, wherein the visual representation comprises:
a user interface control configured to receive an input value from the planning device associated with the revised planning input; and
a graphic presenting resource levels predicted based at least in part on the revised planning input,
wherein activation of a control element causes transmission of the input value from the planning device.

12. A computer-implemented method comprising:
under control of one or more processors,
receiving, from a first planning device, an initial planning input for a time period to predict a resource level for a resource within an organization;
receiving, from the first planning device, an estimated tasking level for the time period for the resource;
generating an initial resource level for the resource based at least in part on the estimated tasking level and the initial planning input;
transmitting, to the first planning device, the initial resource level and the initial planning input;
receiving, from the first planning device, a revised planning input for the time period;
generating a revised resource level for the resource based at least in part on the estimated tasking level and the revised planning input;
generating instructions to present a visual representation based at least in part on the revised resource level and revised planning input;
encoding the visual representation, the revised planning input, and revised resource level into a simulation session record;
retrieving, based at least in part on the simulation session record, at least one of a stored instance of the visual representation or instructions to present a new visual representation;
transmitting, to a second planning device, the at least one of the stored instance of the visual representation or the instructions to present the new visual representation;
creating, in response to receiving the initial planning input, a planning session identifier to uniquely identifying a planning session with the planning device;
storing, in a data storage device, the initial planning input in association with the planning session identifier;
receiving, from the second planning device, a reset message, wherein the reset message includes the planning session identifier;
retrieving the initial planning input from the data store based at least in part on the planning session identifier;
generating an updated resource level based at least in part on the initial planning input, wherein the updated resource level corresponds to the initial resource level of the planning session; and
generating instructions to present an updated visual representation based at least in part on the initial planning input and the updated resource level.

13. The computer-implemented method of claim 12, further comprising:
receiving a first value for a planning input, wherein the first value defines a parameter and an element of the visual representation;
determining a time period defining a boundary of the visual representation based at least in part on the first value;
generating, in a first column of the visual representation, a first bar having a size corresponding to a quantity of the resource at a beginning of the time period; and
generating, in a second column of the visual representation, a second bar and a third bar, wherein the second bar has a size corresponding to a first portion of the resource after the beginning of the time period, and wherein the third bar has a size corresponding to a second portion of the resource after the beginning of the time period.

14. The computer-implemented method of claim 13, further comprising:
generating, in a third column of the visual representation, a third bar having a size corresponding to a quantity of the resource predicted to exit service by an end of the time period.

15. The computer-implemented method of claim 12, further comprising:
generating a user interface control configured to receive an input value from the planning device associated with the revised planning input; and
generating a graphic presenting resource levels predicted based at least in part on the revised planning input,
wherein activation of a control element causes transmission of the input value from the planning device.

* * * * *

UNITED STATES PATENT AND TRADEMARK OFFICE
CERTIFICATE OF CORRECTION

PATENT NO. : 10,810,524 B1
APPLICATION NO. : 15/985478
DATED : October 20, 2020
INVENTOR(S) : Giannakakis et al.

Page 1 of 1

It is certified that error appears in the above-identified patent and that said Letters Patent is hereby corrected as shown below:

In the Specification

In Column 16, Line 48, delete "JAVA™" and insert -- JAVA™, --.

Signed and Sealed this
Twenty-second Day of December, 2020

Andrei Iancu
*Director of the United States Patent and Trademark Office*